(12) United States Patent
Williams et al.

(10) Patent No.: US 8,213,911 B2
(45) Date of Patent: *Jul. 3, 2012

(54) MOBILE COMMUNICATION DEVICE FOR ESTABLISHING AUTOMATED CALL BACK

(75) Inventors: Mark J. Williams, North Canton, OH (US); Eric I. Camulli, Copley, OH (US); Larry Miner, Bath, OH (US)

(73) Assignee: Virtual Hold Technology LLC, Akron, OH (US)

( * ) Notice: Subject to any disclaimer, the term of this patent is extended or adjusted under 35 U.S.C. 154(b) by 476 days.

This patent is subject to a terminal disclaimer.

(21) Appl. No.: 12/320,517

(22) Filed: Jan. 28, 2009

(65) Prior Publication Data

US 2010/0190477 A1 Jul. 29, 2010

(51) Int. Cl.
*H04M 3/42* (2006.01)
(52) U.S. Cl. ............... 455/414.1; 379/210.01; 705/5
(58) Field of Classification Search .......... 370/259–271; 379/157, 158, 210, 142.08, 210.01, 265.02, 379/265.1, 265.13, 265.14, 266.01, 266.02, 379/266.03, 266.04, 266.06; 455/414.1, 455/415
See application file for complete search history.

(56) References Cited

U.S. PATENT DOCUMENTS

| | | | |
|---|---|---|---|
| 5,692,033 A * | 11/1997 | Farris | 379/67.1 |
| 2002/0065759 A1* | 5/2002 | Boies et al. | 705/37 |
| 2002/0193119 A1 | 12/2002 | Goss et al. | |
| 2003/0012558 A1 | 1/2003 | Kim et al. | |
| 2003/0093167 A1* | 5/2003 | Sim | 700/90 |
| 2003/0235287 A1* | 12/2003 | Margolis | 379/265.01 |
| 2006/0012810 A1* | 1/2006 | Postle et al. | 358/1.9 |
| 2006/0182243 A1 | 8/2006 | Yun | |
| 2007/0160076 A1 | 7/2007 | Faber et al. | |

(Continued)

FOREIGN PATENT DOCUMENTS

KR 10-2003-00569994 7/2003

(Continued)

OTHER PUBLICATIONS

International Search Report issued Sep. 18, 2010, in related foreign application under the WIPO, Application No. PCT/US2010/000238.

(Continued)

*Primary Examiner* — Danh Le
*Assistant Examiner* — Dinh P Nguyen
(74) *Attorney, Agent, or Firm* — Andrews Kurth LLP

(57) ABSTRACT

A mobile communication device is provided for enabling a user to establish an automated call back from a communication system, such as a call center, for example. A software device application enables the mobile communication device to communicate with the call center through the exchange of data. The mobile communication device includes a display screen for displaying controls for allowing the user to interact with the communication system. The controls allow the user to request a list of providers from which to select a provider or company to contact. The mobile communication device further provides controls for allowing the user to select a queue to join from a list of queues associated with the selected provider. For example, one queue may be related to billing and another queue may be related to another aspect of customer service. The user may then request the expected wait time in the selected queue for receiving a call-back from the communication system. Typically, the mobile communication device receives the expected wait time, and then the user may send a confirmation to the communication system for a voice call-back.

21 Claims, 11 Drawing Sheets

U.S. PATENT DOCUMENTS

2007/0274495 A1* 11/2007 Youd et al. ............... 379/210.01
2008/0063180 A1   3/2008 Barsness et al.

FOREIGN PATENT DOCUMENTS

KR   10-2004-0104097 A   12/2004
KR         10-0612440 B1    8/2006
KR           10-07659967   10/2007
WO       WO2004-081720    9/2004

OTHER PUBLICATIONS

International Search Report issued Oct. 12, 2010, in related foreign application under the WIPO, Application No. PCT/US2010/000239.

* cited by examiner

Figure 7A

| Media Layer Protocols | TCP/IP & HTTP<br>Source IP Address & Port<br>Destination Address & Port | Protocol Information 102<br><RPC ID> Active Provider Method </RCP ID> 104<br><User ID> John Doe </User ID> 106 |
|---|---|---|

| Media Layer Protocols | TCP/IP & HTTP<br>Source IP Address & Port<br>Destination Address & Port | Protocol Information 120<br><RPC ID> Active Queues </RCP ID> 122<br><Selected Provider> John Doe </Selected Provider> 124 |
|---|---|---|

| Media Layer Protocols | TCP/IP & HTTP<br>Source IP Address & Port<br>Destination Address & Port | Protocol Information 140<br><RPC ID> EWT </RCP ID> 142<br><Selected Provider> Company A </Selected Provider><br><Selected Queue> Queue ID </Selected Queue> } 144 |
|---|---|---|

110 | 108 | 138 } 56

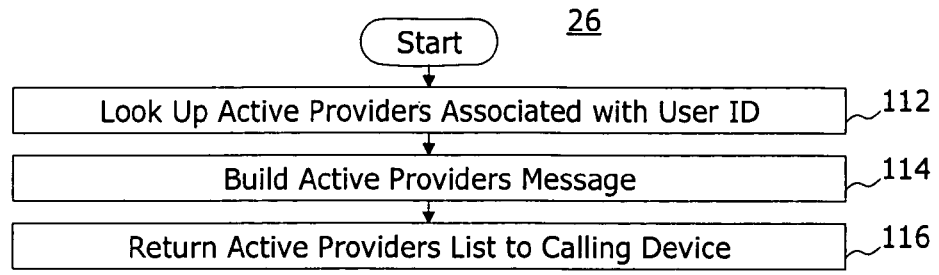
Figure 8A
| User ID 204 | Active Providers 206 |
|---|---|
| John Doe | Company A, Company B, Company C |
| Jane Doe | Company B, Company C, Company D |
| ... | ... |
Figure 8B
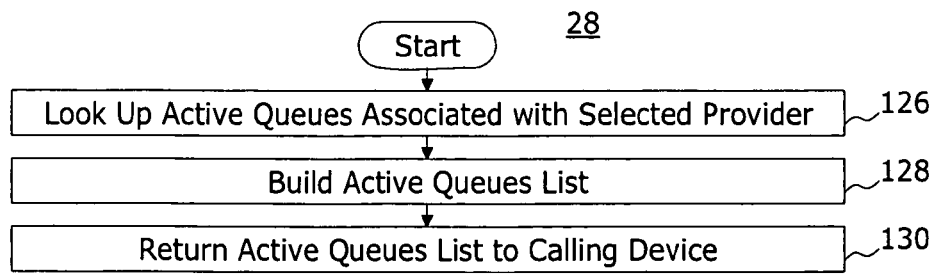
Figure 8C

| Company ID 212 | Active Queues 214 |
|---|---|
| Company A | Service Outage, New Service, Billing, Other |
| Company B | Checking/Savings, Credit Card, Mortgages, Other |
| Company C | New Reservation, Existing Reservation, Account, Other |
| Company D | Service A, Service B, Service C, Other |
Figure 8D
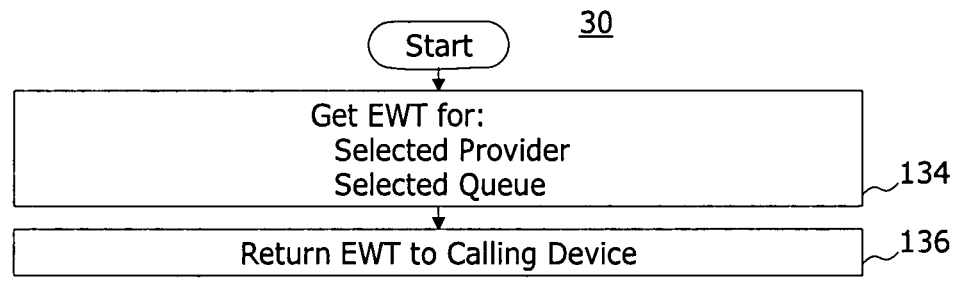
Figure 8E
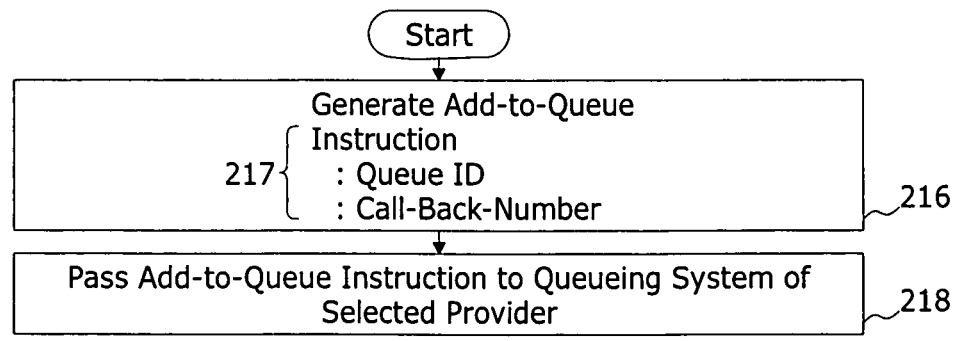
Figure 8F

MOBILE COMMUNICATION DEVICE FOR ESTABLISHING AUTOMATED CALL BACK

TECHNICAL FIELD

The systems and methods relate to managing the queuing of clients waiting to be connected by telephone to a service agent of a business communication center. More particularly, the systems and methods relate to enabling clients to be added to a queue utilizing web service messaging and relate to establishing a telephony connection between clients and service agents on an automated basis and in an order maintained by a queue.

BACKGROUND

Many businesses use groups of service representatives for communicating with clients who initiate communications with the business, such as by telephone calls. To most efficiently use the time and skills of each service representative, the service representatives may be organized into groups based on a skill set. For example, the groupings may be based on the representatives ability to handle client issues such as the opening of new accounts, billing issues and customer service issues on existing accounts.

Typically, if a client calls such a business, voice prompt menu choices enable the calling client to identify the issue for which the client requires service and the client is then queued for a service agent capable of handling the identified issue. As such, it is expected that clients who identify the purpose of their call as a "billing issue" will be queued for, and connected to, a service representative with the ability to handle billing issues. Similarly, it is expected that clients who identify the purpose of their call as a "customer service issue" will be queued for, and connected to, a service representative with the ability to handle customer service issues.

There are problems with existing communications systems, such as contact centers, including the following two problems. First, the voice prompt menus that are used to channel callers to the queue for the appropriate group of service agents are exacerbating to a client at best. It takes significant time to navigate the layered menus of voice prompts.

Second, waiting on-hold while the telephone connection is maintained in queue for connection to a service agent is also exacerbating to a client at best.

In an effort to reduce customer exacerbation caused by having to maintain a connection while on-hold in queue, secondary queue systems have been developed. A typical secondary queue system obtains a telephone number at which the calling client can be reached when a service representative is available (i.e., a call back number). The client disconnects, and then, at the proper time, a call back system establishes a connection to the client utilizing the call back number and couples the client to an available representative without waiting on-hold in queue. One exemplary system is disclosed in U.S. Pat. No. 6,563,921 to Williams et al. which is commonly assigned with the present application.

While such a system may make the experience of waiting for a connection to a service representative slightly less exacerbating, it does not address the inconvenience of having to navigate an irritatingly slow and usually complicated voice prompt menu to enter the queue.

Therefore, what is needed is: i) a method and system for adding clients to a queue in a more convenient manner; and ii) a method and system for establishing a telephony connection between the client and the service agents in an automated fashion.

SUMMARY

In an embodiment, a method for a communication system that receives incoming communications from a mobile communication device, has queues, and will call-back to a communication receiving device is used. The method includes receiving data from the mobile communication device (where the data includes an identifier associated with a communication receiving device) and determining, from the received data, a queue desired for the identifier, where the queue is a service agent queue. The method further includes (a) determining the expected wait time in the queue, (b) sending information to the mobile communication device, where the information includes the expected wait time in the queue, and (c) assigning a placeholder for the identifier in the queue. If a call back request is received from the mobile communication device, the method includes initiating a call back to the communication receiving device based upon the assigned placeholder in the queue and placing an outgoing telephone call to the communication receiving device.

Also, a method for use in a system that receives incoming communications from a mobile communication device and will queue a call back is described.

In an embodiment, a communication system for receiving incoming communications from mobile communication devices and for initiating a call-back includes a sequence component that initiates a call-back sequence to a communication receiving device. In this embodiment, the sequence component is in communication with a mobile communication device and, based on the communication, the sequence component determines a queue and confirms a call back. The system further includes a queue component having more than one queue, where a placeholder is assigned for an identifier associated with the communication receiving device in the determined queue. The system also includes an expected wait time component for determining the expected wait time in the determined queue. The expected wait time is provided to the sequence component and the sequence component communicates information regarding the expected wait time to the mobile communication device. The system of this embodiment further includes a call-back component for placing an outgoing call to the communication receiving device, where the sequence component prompts the call back component to place the outgoing call.

In addition, a computer-readable medium including instructions for initiating a call-back sequence is described.

In an embodiment, a mobile communication device for initiating a call-back sequence includes a display screen, a processor for executing a device application and a memory for storing the device application. The device application includes a queue control, where the queue control displays, on the screen, an indication of a queue and obtains a user selection of the queue as a selected queue. The device application further includes an expected wait time client, where a sequence component sends an expected wait time services call and receives an indication of the expected wait time, and where the expected wait time services call includes identification of the selected queue. The device application also includes a confirmation control to display, on the screen, the indication of the expected wait time where a user selection of one of a confirmation command and a cancel command is obtained. The device application includes a confirmation wait time client that generates a confirmation services call to the sequence component in response to user selection of the confirmation command, the confirmation services call includes at least a communication receiving device identifier and an instruction to add the mobile device identifier to the selected queue.

A computer readable medium including instructions for a mobile device to initiate a call-back sequence in a communication system is also described.

BRIEF DESCRIPTION OF THE DRAWINGS

FIGS. 7A-7D represent exemplary messaging structures packaged with transport layer and media layer information;

FIG. 8A is a flow chart representing exemplary operation of an active providers service or method in accordance with an exemplary embodiment of the present invention;

FIG. 8B is an exemplary active providers data storage in accordance with an exemplary embodiment of the present invention;

FIG. 8C is a flow chart representing exemplary operation of an active queues service or method in accordance with an exemplary embodiment of the present invention;

FIG. 8D is an exemplary active queues data storage in accordance with an exemplary embodiment of the present invention;

FIG. 8E is a flow chart representing exemplary operation of an expected wait time service or method in accordance with an exemplary embodiment of the present invention; and FIG. 8F is a flow chart representing exemplary operation of an ad-to-queue method in accordance with an exemplary embodiment of the present invention.

DETAILED DESCRIPTION

Figure 1:
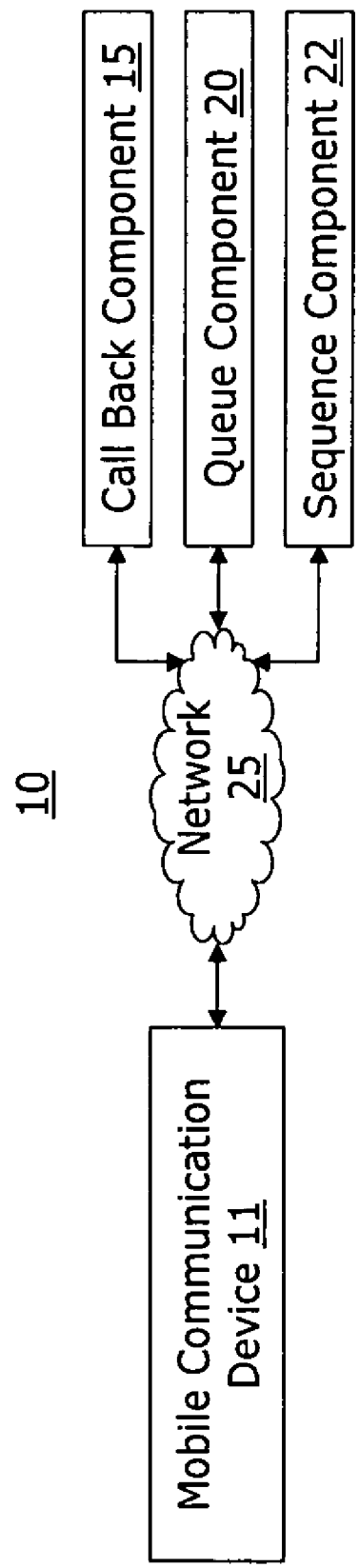
FIG. 1 is a block diagram representing an exemplary architecture of a system for sequencing mobile communication devices in a selected queue of a selected provider.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code which is encoded within computer readable media accessible to the processor, or a combination of a hardware circuit(s) and a processor or control block of an integrated circuit executing machine readable code encoded within a computer readable media. As such, the term circuit, module, server, or other equivalent description of an element as used throughout this specification is intended to encompass a hardware circuit (whether discrete elements or an integrated circuit block), a processor or control block executing code encoded in a computer readable media, or a combination of a hardware circuit(s) and a processor and/or control block executing such code.

It should also be appreciated that the table structures represented in this application are exemplary only and intended to show the mapping of relationships between various data elements. Other table structures may store similar data elements in various manners. Further, the applicant's use of the term "plurality" is intended to indicate not just "at least one", but one, two, three, or any other quantity. The applicant's use of the term "group" is intended to indicate not just "at least one", but two, three, or more of the items within the group.

FIG. 1 is a high level schematic illustration of a system 10 for placing a mobile communication device 11 in a queue and calling the mobile communication device 11. The system 10 includes the mobile communication device 11, a network 25, a call back component 15, a queue component 20 and a sequence component 22.

The system 10 assigns a placeholder for a mobile communication device 11 (or an identifier for a mobile communication device 11 such as its telephone number or other unique network identifier) in a selected queue (not shown in FIG. 1) of the queue component 20. The system uses a sequence component 22 to execute a call back sequence to a mobile communication device 11. When prompted, the call back component 15 places an outgoing call to a mobile communication device 11. The outgoing call attempts to establish a voice connection with the mobile communication device 11.

In some embodiments, prior to allowing communication between a mobile communication device 11 and the system 10, the system 10 performs one or more security checks. These security checks can be performed for a variety of purposes including to ensure that the software on the mobile communication device 11 is authentic and valid for use on the device and that the device is authorized. Various software routines may be used by the system 10 and the mobile communication device 11 to perform security checks. Encryption keys may be assigned to the mobile communication devices 11 and used for the security check.

In an embodiment, the identifier for a mobile communication device 11 is an encryption key. Each software application for communicating with the system 10 on a mobile communication device 11 may have one or more unique encryption keys that are recognized by the system 10.

The network 25 (depicted by a cloud) can be any one or more of a variety of networks. The system 10 shown can support many mobile communication devices 11 of various types and many queues (not shown in FIG. 1). The mobile communication device may communicate with the other components through the network using available techniques.

Figure 2:
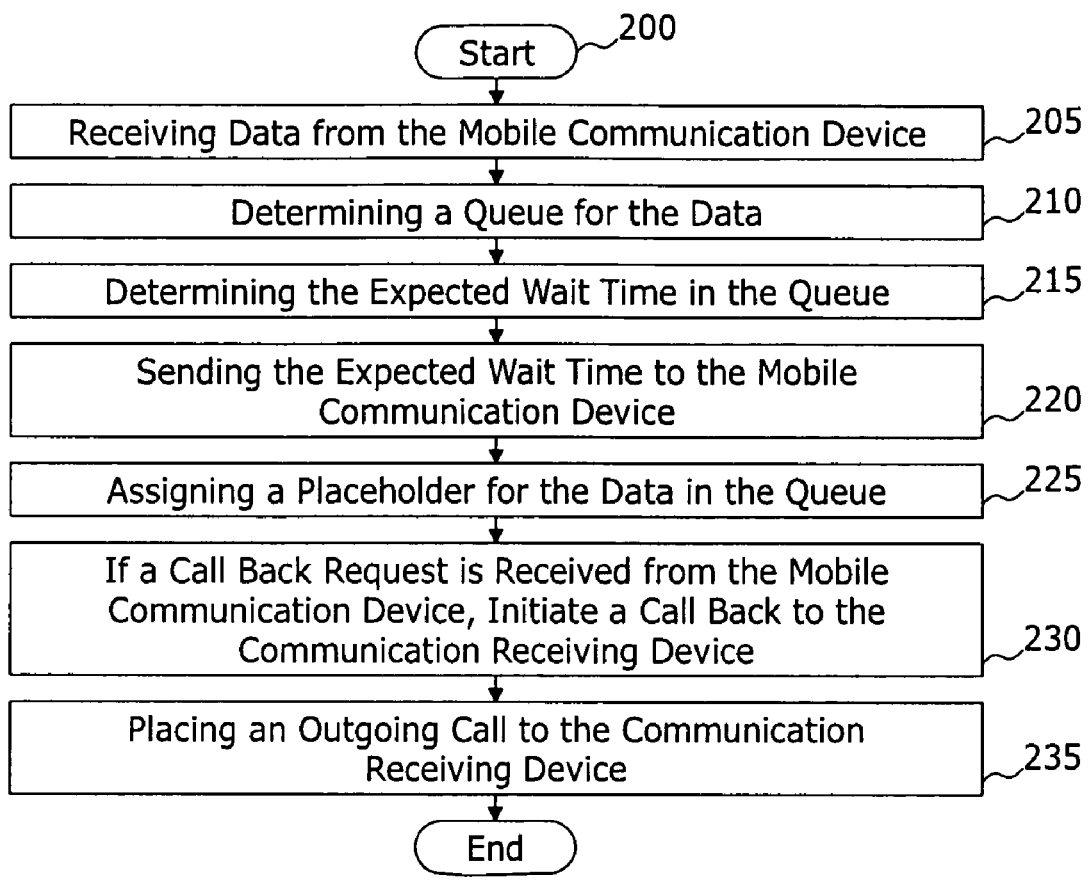
FIG. 2 is a flow-chart of a method for call back sequencing.

Referring now to FIG. 2, shown is a flow chart of an exemplary embodiment of a method for initiating a call-back sequence in a communication system, such as a call center or contact center, for example. The method 200 includes receiving data from a mobile communication device 11 (205), determining a queue for the data (210), determining the expected wait time in the queue (215) for the data and sending the expected wait time in the queue to a mobile communication device 11 (220). The method further includes assigning a placeholder for the data in the queue (225). If a call back request is received from the mobile communication device 11, the method includes initiating a call back to a communication receiving device. The method further includes placing an outgoing call to a communication receiving device (235). The steps of the method may be performed in various different orders or chronology.

The communication receiving device may be any device that can receive a telephone call. The communication receiving device is often the mobile communication device that sent the initial data requesting a telephone connection.

Figure 3A:
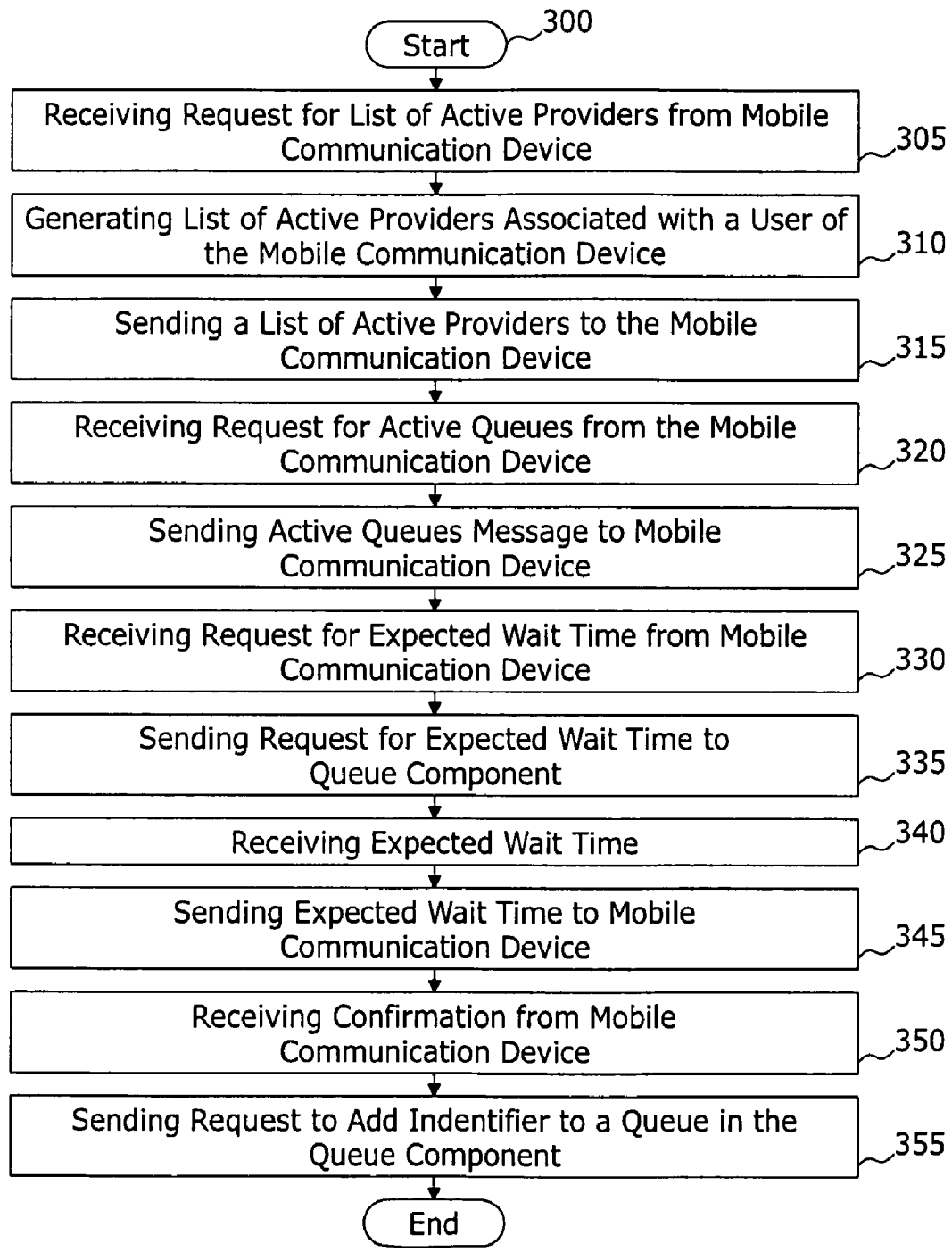
FIG. 3A is a flow-chart of a method for assigning a placeholder in a queue for a call back to a mobile communication device.

FIG. 3A is a flow chart of an embodiment of a method 300 for assigning a placeholder in a queue for a call back to a mobile communication device 11 in a communication system. The description of the method 300 in FIG. 3A also references components and routines found in FIG. 3B. The method 300 of FIG. 3A includes the sequence component 22 receiving a request for a list of active providers from a mobile communication device 11. This may be in the form of an active provider remote processing call 48 from a provider client routine 34 (305). The provider client 34 is a routine which is part of the session queuing component 24. The active provider remote processing call 48 originates from the mobile communication device 11 and serves as the request for a list of active providers. The active providers may be associated with a user of the mobile communication device 11. Upon receipt of the active provider remote processing call 48, the sequence component 22 launches an active provider routine 26. The routine generates a list of active providers associated with the user (310) of the mobile communication device 11.

The method 300 further includes active provider routine 26 sending a list of active providers to the mobile communication device 11 via an active providers message 50. More particularly, the provider client routine 34 in the session queuing component 24 receives active providers message 50 (315).

The method 300 further includes receiving a request for active queues in the queue component 20 via an active queue remote processing call 52 from the mobile communication device 11 (320). The active queue remote processing call 52 serves as a request for a listing of active queues associated with the selected provider to an active queue routine or process 28 of the sequence component 22. The listing is populated into the service control 40 of the session queuing component 24.

The exemplary method 300 of FIG. 3A further includes sending active queues, via an active queues message 54, from active queue routine 28 to service client routine 38. The service client routine 38 in this example is resident on the mobile communication device 11 (325). The active queues message 54 includes active queues wherein an identifier of a mobile communication device 11 may be placed.

The method 300 further includes receiving a request for the expected wait time for receiving a call back from a provider. The expected wait time may be received via an expected wait time call 56 from the mobile communication device 11 (330). Upon the user selecting a queue using the service control 40, the expected wait time client 42 generates an expected wait time call 56 to the sequence component 22. The method 300 includes the expected wait time routine 30 sending a request 62 for the expected wait time to the expected wait time component 18 (within the queue component 20) (335) and receiving the expected wait time 64 (340) from the expected wait time component 18.

With continuing reference to FIG. 3A, the method 300 further includes sending an expected wait time message 58 to the mobile communication device 11 (345). More particularly, the expected wait time message 58 is sent from the expected wait time routine 30, of the sequence component 22, to an expected wait time client 42 of the session queuing component 24. The method 300 further includes receiving a confirmation call 60 from the mobile communication device 11. More particularly, the confirmation call originates from confirmation client 46 (part of the session queuing component 24) and is sent to the confirmation routine 32 (350) of the sequence component 22. The method 300 further includes sending a request via a message 66 to the queue component 20 to add user's identifier to the selected queue (355).

Figure 3B:
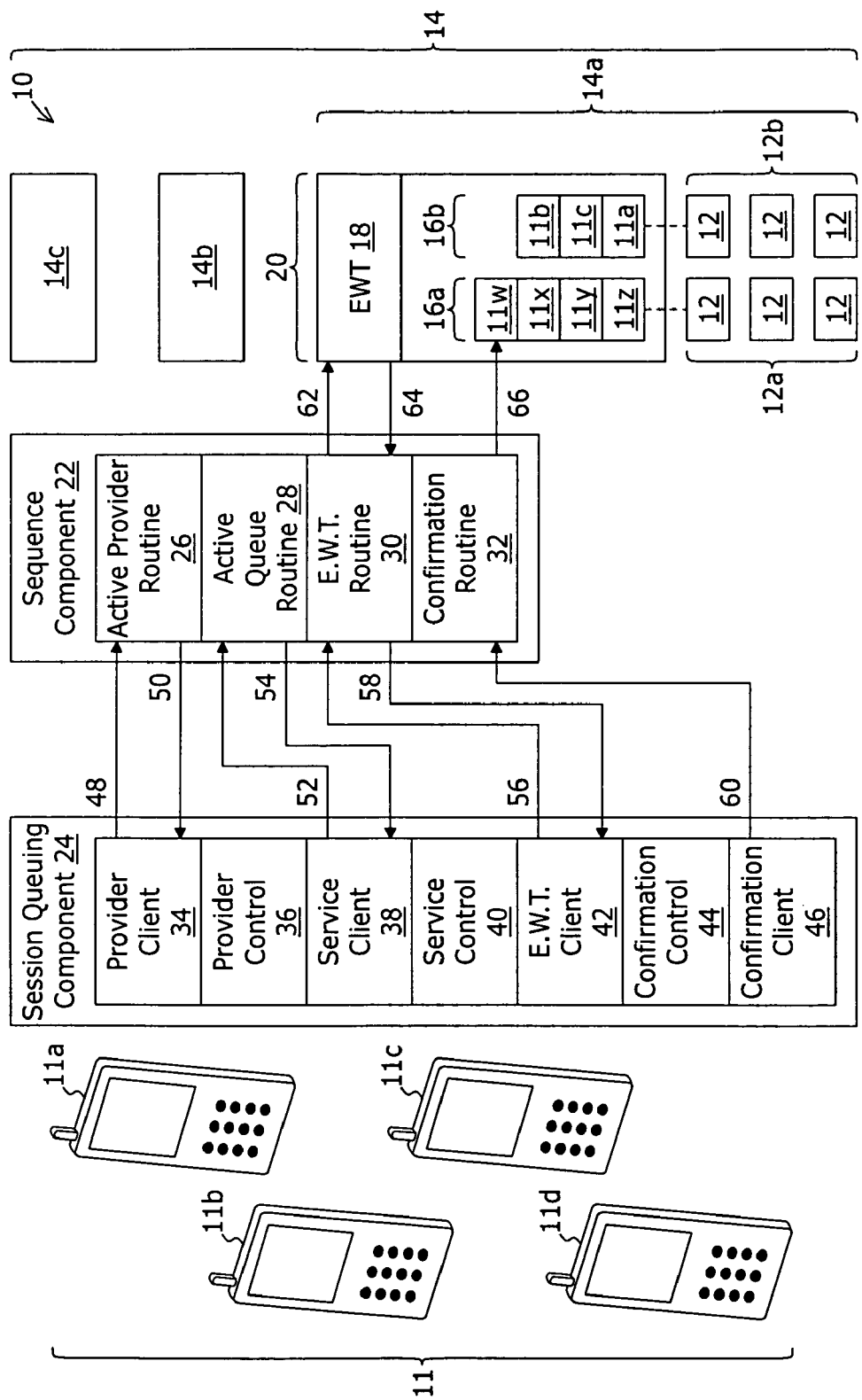
FIG. 3B is a block diagram representing an exemplary architecture of a system for sequencing mobile communication devices in a selected queue of a selected provider.

FIG. 3B is a schematic diagram of an embodiment of a telephone based system 10 showing multiple mobile devices 11a-11d and multiple business communication centers 14a-14c. Each business communication center 14a-14c is typically associated with a company for which the business communication center 14a-14c is operated. The system 10 includes sequence component 22 and a session queuing component 24. The sequence component 22 performs the call back sequencing of the mobile communication devices 11a-11d. The session queuing component 24 resides within a mobile communication device 11 and can be loaded onto each mobile communication device 11a-11d.

With continuing reference to FIG. 3B, each business communication center (using business communication center 14a for reference) may be associated with a company and comprise a group of service agents 12. Each of the service agents 12 may be a service representative system for enabling a service representative to service a client. More specifically, the service representative may participate in an audio session with a mobile communication device 11 and service the requests of each client, or routine, of the session queuing component 24. The service agents 12 may be organized in a single service agent set grouped into multiple service agent sets based on the skill set of service agent operators (e.g., the operators of the service agents 12 at a communication system).

In an embodiment, the business communication center 14a has at least one computer system including a processor operating the queue component 20, and memory. In general, the queue component 20 is adapted to maintain a group of queues 16a, 16b with each queue 16a, 16b being associated with one of sets 12a, 12b of the group of service agents 12. For example the set of service agents 12a may be associated with queue 16a while the second set of service agents 12b may be associated with queue 16b.

In an embodiment, the queue component 20 identifies a sequential order of the mobile devices 11w, 11x, 11y, and 11z, which are queued for connection to one of the service agents 12.

Expected wait time component 18 is adapted to determine an expected wait time value representing the time at which service agents 12 within the particular service agent group are expected to be available to service a client. The expected wait time can be calculated or determined in a number of different ways.

The expected wait time value may represent an estimated wait time calculated using primary estimated wait time techniques such as projecting a wait time based on the quantity of clients in the queue and any of a historical, present, or projected time allotment for handling each such queued client. Alternatively, the expected wait time value may be a function of both a primary estimated wait time calculation and a wait time augmentation calculation made based on service agent availability and/or scheduled change in service agent availability as disclosed in co-pending patent application Ser. No.

11/143,857 filed on Jun. 2, 2005 and assigned to the same assignee as the present invention. Such patent application is incorporated herein by reference.

The sequence component 22 may be embodied as a web services server. In one embodiment, the sequence component is connected to the internet and includes appropriate web services messaging systems (i.e., Simple Object Access Protocol or SOAP) for communicating with the session queuing component 24 on the mobile devices 11a-11d. In an embodiment, the sequence component 22 communicates with queue component 20.

The sequence component 22 may include a processor (not shown) for executing the web services messaging systems as well as other applications stored on a memory (not shown). Such other applications may comprise an active provider routine 26, an active queue routine 28, an expected wait time routine 30, and a confirmation routine 32.

The session queuing component 24 may include a number of routines including for example, a provider client 34, a company or provider control 36, a queue or service client 38, a queue or service control 40, an expected wait time client 42, a confirmation control 44 and a confirmation client 46.

It should be appreciated that each of the routines of the session queuing component 24 are exemplary and for illustrative purposes. Those skilled in the art will recognize that the systems and functions of each routine described herein may be implemented by way of other permutations of components and sub systems.

In an embodiment, the session queuing component 24 may be an embedded application of a mobile communication device 11. In another embodiment, the session queuing component may be a java script, ActiveX, or other similar structure downloaded and executed by a browser and an applicable browser plug-in executing on the telephone 11. In this embodiment, the session queuing component 24 may include a combination of the java script or ActiveX control and components of the browser and/or the plug-in, which in combination drive operation of the session queuing component 24.

In an embodiment, the session queuing component 24 communicates with the sequence component 22 using web service messages and internet protocol. In an embodiment, the session queuing component 24 obtains user selection of a provider (from a group of providers) with which the user desires to communicate via a telephone communication session. The session queuing component 24 may also obtain user selection of a service of the selected provider (from a group of services) and an estimated wait time representing a duration of time the user can be expected to wait until connecting to the selected services. Session queuing component 24 confirms, after presenting the expected wait time to the user, that the user desires to connect to a service agent 12. More specifically, it confirms that the user wishes to speak with a particular type of service agent 12. The session queuing component 24 assists in placing the user in a queue for the user to receive a call back from the service agent 12 at a connection time.

The connection time may be when the user reaches the first position in the queue (i.e., after other clients in the selected queue prior to the client have all been connected to available service agents or abandoned their position in the queue selected) and a service agent becomes available, or at a specific scheduled time. The specific scheduled time may be a time calculated by adding the expected wait time to the time at which the expected wait time was presented to the user. The specific scheduled time may also be a time selected by the user.

The term "provider" is used interchangeably with the term "business communication center" or the "provider's business communication center" within this application, and the term "queue" is used interchangeably with the term "service" or the "queue for connection to a service agent providing the selected service."

Figure 4:
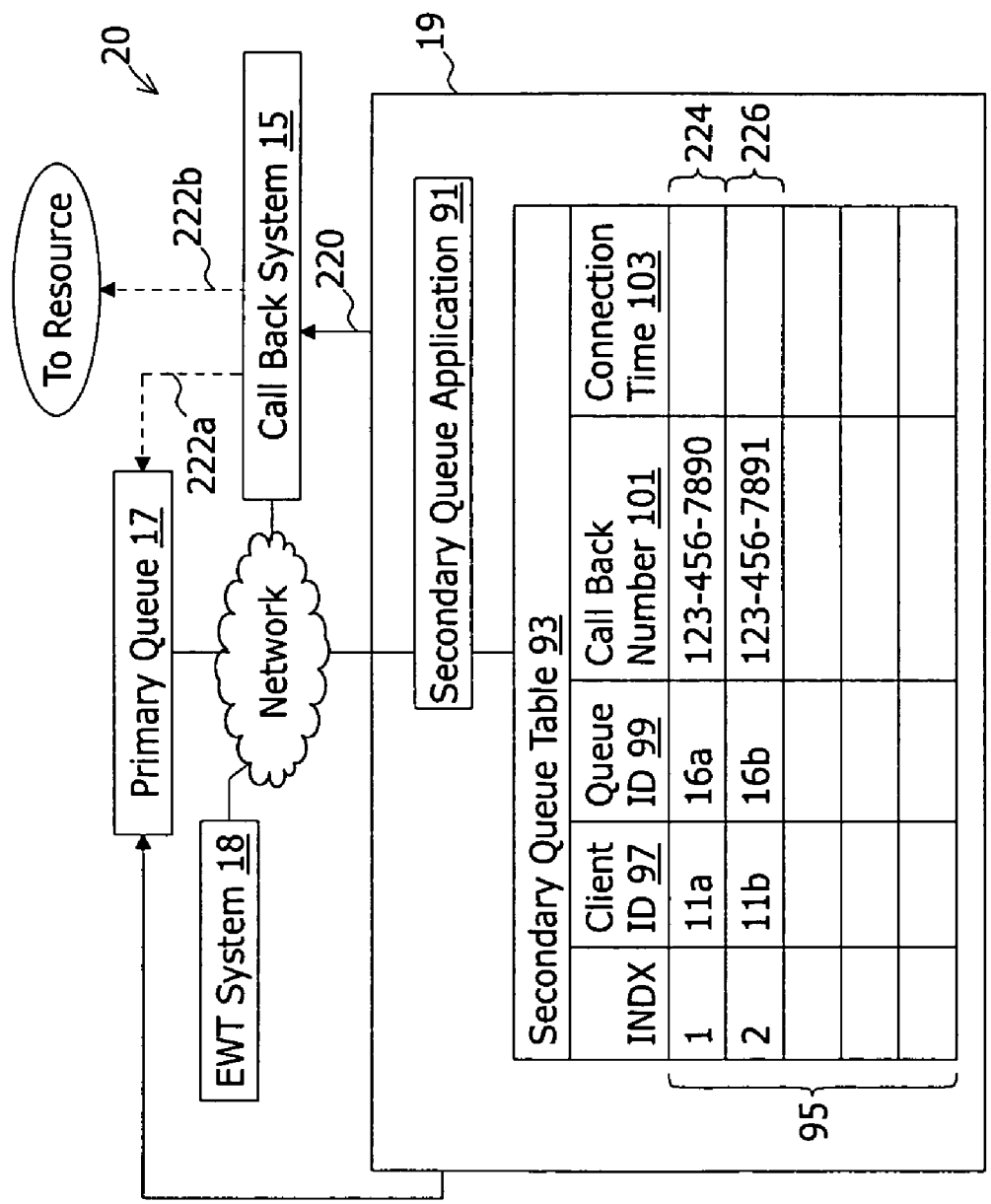
FIG. 4 is a block diagram of an exemplary queue component.

FIG. 4, is a block diagram of an embodiment of queue component 20. The queue component 20 may include primary queue 17 (ACD) adapted to queue mobile communication devices 11 while maintaining the telephony connection (e.g., mobile communication devices "on-hold"), a secondary queue component 19, a call back component 15 adapted to establish a telephony connection to mobile communication device 11 for which a telephony connection is not maintained by the primary queue 17, and an expected wait time component 18.

The primary queue 17 may be embodied in a primary automated call director (ACD). In an embodiment, the ACD places in a queue client telephone connections which are "on-hold" waiting for a service agent 12. Such an ACD may use known technology adapted to (1) receive incoming calls from the mobile communication device 11 (e.g., establishing a client connection with each) (2) identify which group of service agents the caller desires to connect (including using primary voice prompts) and (3) place the call in a queue for connection to the identified service agent group. If one of the service agents 12 within a service agent group becomes available, the ACD connects a next client connection from the queue to the available service agent 12.

The secondary queue component 19 may be coupled to a primary queue 17 as an accessory device. The secondary queue component 19 maintains the queue position of the mobile communication device 11 in a manner that does not require the mobile communication device 11 to remain "on hold" or otherwise maintain an active telephone connection with the primary queue 17. More specifically, for a mobile communication device 11 calling the communication center utilizing the primary queue 17, the secondary queue component 19 may (1) obtain a network address for the mobile communication device 11 (e.g., a telephone network call back telephone number or other telephone network address) and (2) write the network address of the telephone connection to a record of the queuing table (for example record 224 in the event a user of mobile communication device 11a calls the communication center in a primary manner). Further, the secondary queue component 19 may, at the appropriate connection time, (3) induce the call back system 15 to establish a connection to the mobile communication device 11 utilizing the call back number. Inducing the call back system 15 to establish the connection may include generating a call back message 220 to the call back system 15.

The secondary queue component 19 may also (e.g., mobile communication devices 11 being added to a queue utilizing telephone system 10), obtain a network address of a telephone connection to the mobile communication device 11 (e.g., a telephone network call back telephone number or other telephone network address) via the messaging discussed above with respect to messages 62, 64, and 66 in FIG. 3B. The secondary queue component 19 may write the network address of the telephone connection to a record of the queuing table (for example record 226 in the event a user of mobile device 11b utilizing system 10 for being added to queue 16a), and at the appropriate connection time, induce the call back system 15 to establish a connection to a mobile communication device 11 utilizing the call back number. Inducing the call back system 15 to establish the connection may include generating a call back message 220 to the call back system 15. The call back message 220 may include identification of the telephone number to which the call back system 15 is to establish a telephone connection and identifying the queue 16a, 16b and/or service agent group 12a, 12b to which the telephone connection is to be connected.

After the call back system 15 has established a connection with the mobile communication device 11, it may generate a priority connection to the available service agent 12 within the appropriate service agent group 12a, 12b.

The priority connection 222 may be a transfer 222a of the mobile communication device 11 connection to the primary queue 17. Transfer 222a may occur via a command such that the primary queue 17 connects the client to the next available one of the service agents 12 within the required service agent group 12a-12b (e.g., places the client at the front of the queue). The priority connection 222 may also be a connection 222b directly to the next available service agent 12, bypassing primary queue 17.

The secondary queue system 19 may comprise a secondary queue application 91 and a secondary queue table 93. The secondary queue table 93 maintains, for each mobile communication device 11 being handled by the secondary queue component 19, call back information. In more detail, secondary queue table 93 may comprise a plurality of records 95. Each record 95 associates a client identifier 97 with a call back telephone number 101 (or other network identifier) to which a telephone connection may be established with the subject mobile communication device 11, or other communication receiving device at a connection time 103. Secondary queue table 93 may also include a service agent ID 99 identifying the service agent 120, or subset of the group of service agents to which the client 11 is to be connected.

In one aspect, the secondary queue application 91 monitors the passage of time and, upon determining that time has advanced to the connection time 103 of one of the records 95 of the secondary queue table 93, drives the call back system 15 to establish a telephony connection to the subject client. Again, the telephony connection may be a primary PSTN connection or a telephony connection using an alternative technology such as VoIP.

After establishing the telephony connection, the priority connection to a service agent 12 within the required service agent group is generated.

The expected wait time component 18 may be part of the secondary queue system 19, part of the primary queue (ACD) 17, or a separate accessory system interoperating with the secondary queue system 19 and the primary queue (ACD) 17.

Figure 5B:
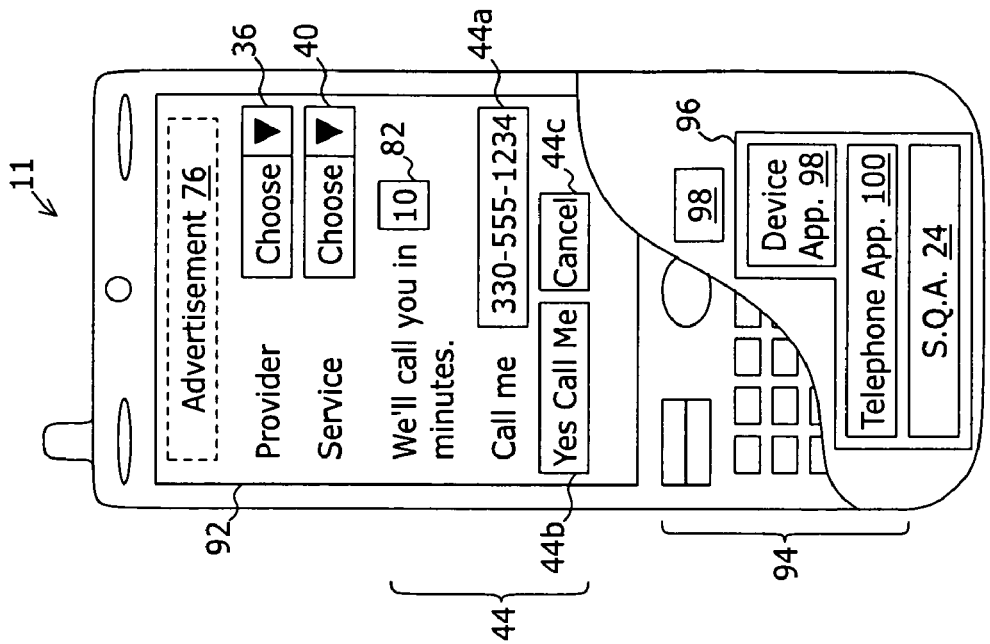
FIG. 5B is an exemplary mobile device adapted for operation in accordance with an exemplary embodiment of the present invention.
Figure 5A:
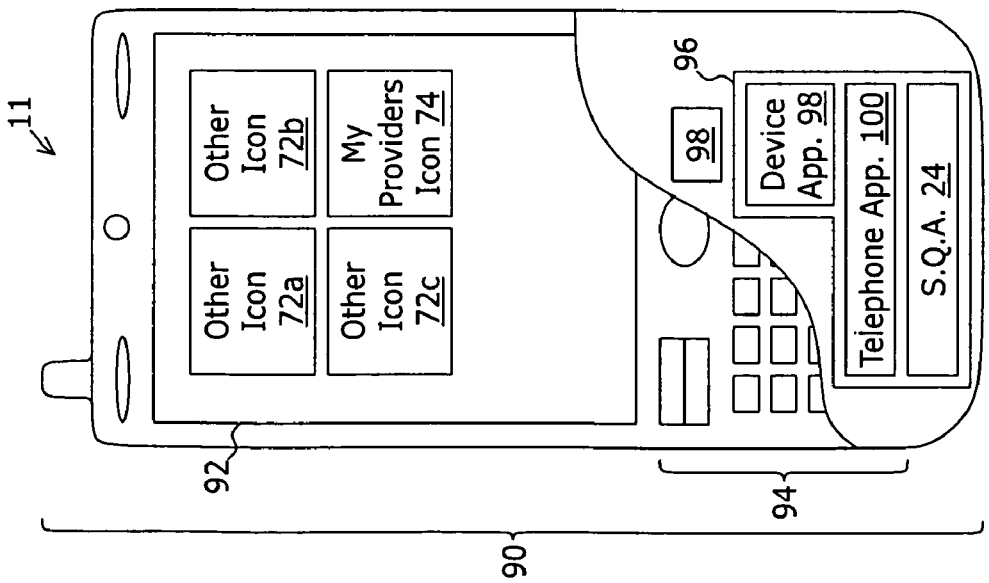
FIG. 5A is an exemplary mobile device adapted for operation.

Referring now to FIG. 5A, each mobile device 11 may include user interface 90 inclusive of display screen 92 and controls 94 (such as keys, touch panel, or other controls) for operation of controls rendered on the display screen (keys are represented), memory 96, and processor 98 for executing applications encoded in the memory 96.

The applications encoded in memory 96 may include a telephone application 100, and/or appropriate systems adapted to drive operation of the user interface, and the session queuing component 24.

The telephone application 100 may be adapted to signal, establish, and maintain an audio communication session (either as the session initiator or receiver) with remote endpoint devices over compatible networks (PSTN, VoIP, and other networks utilized for audio communication sessions). The endpoint devices include the business communication center systems 14 for signaling, establishing, and maintaining audio communication sessions between each service agent 12 and the business clients, each of which may utilize one of the mobile devices 11 for communication with the business.

The session queuing component 24 may include a launch object 74 rendered as a "My Providers" icon on the display screen 92 and adapted to launch operation of the session queuing component 24 upon detecting user selection of the launch object 74.

Referring now to FIG. 5B, for purposes of performing the above described functions, visible objects of the session queuing component 24 (following activation by selection of the launch icon 74 as depicted in FIG. 5A) include a provider control 36, a service control 40, and a confirmation control 44.

The confirmation control 44 may include a window 44a for confirming the identifier of a mobile communication device 11 (i.e., the call back telephone number utilized to establish an inbound telephone call to the mobile communication device 11 or other unique "call back" identifier used to establish an audio session with the mobile communication device 11), an accept control object 44b and a cancel control object 44c.

In an exemplary embodiment, the telephone number of the mobile communication device 11 may be pre-populated to the window object 44a with the window object being active to enable the user to modify the telephone number in the event he or she desires the call back to be at a different telephone station.

The cancel control object 44c may be a selection button adapted to detect user selection. Upon detecting user selection, cancel control object 44c may be adapted to terminate operation of the session queuing component.

The accept control object 44b may be a selection button adapted to launch the confirmation client 46 upon user selection.

Upon launch of the session queuing component 24 the visible objects of the session queuing component 24 may be rendered on the display screen 92 as depicted in FIG. 5B.

The provider control 36 may be rendered in an active state with the group of providers 78 (FIG. 6) populated into its drop down menu. From this menu, the user may select providers from the selected business communication center. The service control 40 is shown in an active state. The service control 40 and the confirmation control 44 may be rendered in an inactive state (i.e., rendered with no populated data, inoperable, and rendered with a gray tint to indicate the inactive state). In an embodiment, the provider client 34 (shown in FIG. 3B) populates the provider control 36 with a listing of the providers from the group of providers 78.

Figure 6:
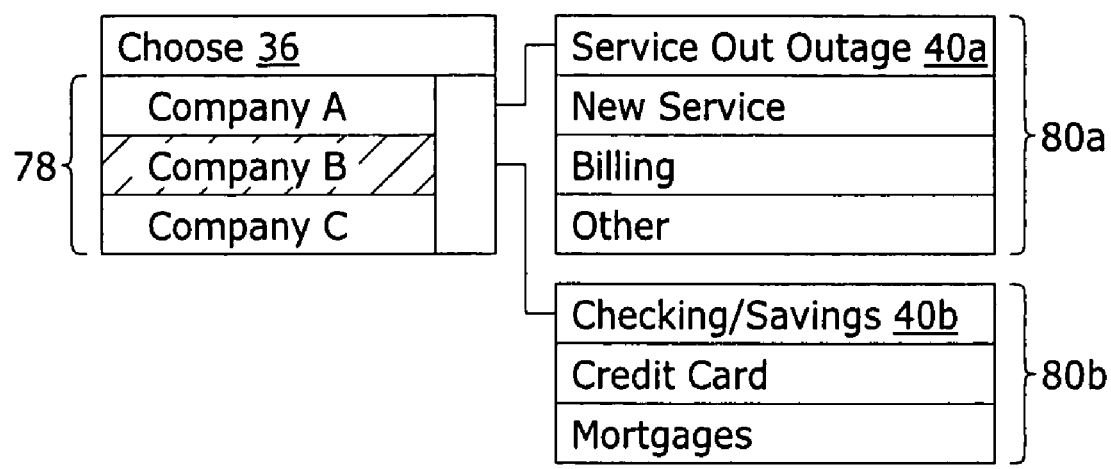
FIG. 6 is a table representing an exemplary provider control and an exemplary service control in accordance with an exemplary embodiment of the present invention.

Referring now to FIG. 6, shown is an illustration of the provider control 36. The provider control 36 may be a drop down menu control which displays a group of providers 78. From this menu, the user may select a provider from the selected business communication center.

The service control 40 may be a drop down menu control (as represented by 40a, 40b) which displays, for the selected provider, the services/queues of a group of services/queues 80a, 80b associated with the selected provider's business communication center. A user may select a service from this menu.

Exemplary providers include Company A and Company B. For purposes of illustration, Company A may be a utility company and its services/queues associated with its business communication center may include a service/queue for reporting loss of services, a service/queue for handling billing matters, and a default service/queue for handling other matters.

Company B, for illustration, may be a bank and its services/queues associated with its business communication center may include a service for handling of checking, savings, or other deposit accounts, a service for handling credit card accounts, a service for handling mortgage accounts, and a default service for handling other matters.

FIG. 7A, shows an exemplary embodiment of a structure for communications or messages passing between the mobile communication devices 11 and service providers. In this example, the structure of an active providers remote processing call 48 is shown. The structure may be an XML structure 100 with applicable SOAP or other remote processing call protocol information 102. The exemplary structure includes at least a method identifier 104, which identifies the active provider routine or process 26 as the remote process, and data arguments 106 for the active provider routine 26. The data arguments 106 may include at least identification of the user.

The remote processing call 48 may be encapsulated within appropriate TCP/IP and HTTP headers and other transport layer information 108 such as source IP address and source port number of the requesting device 11 and destination IP address and destination port number of the sequence component 22. Such combination may be encapsulated within appropriate media layer protocols 110 for transmission across physical communication media via various physical layer segments interconnecting the requesting device 11 and the sequence component 22.

Figure 7D:
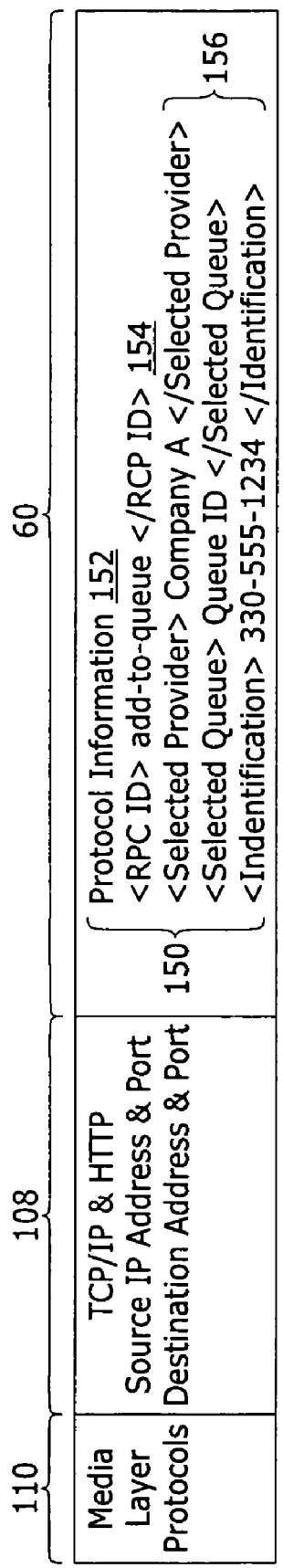

FIGS. 7B-7D show exemplary structures of other messages or communications within system 10 similar to that of active providers remote processing call 48. The other communications that may be similarly structured, encapsulated, and transported may include the active queue remote processing call 52 (FIG. 7B), expected wait time call 56 (FIG. 7C), add-to-queue remote processing call 154, the active providers message 50, the active queue message 54, the expected wait time message 58, and the confirmation remote processing call 60 (FIG. 7D), for example.

More specifically, referring to FIG. 8A and FIG. 8B, the active provider routine 26 includes a looking up (at step 112) in an active providers data store 200, a list of active providers associated with the user. The active providers data store 200 and may include a group of records 202, with each record associating a user ID 204 with identification of a group of active providers 202 associated with the user ID 204. Step 114 represents building an active providers message 50 (shown in FIG. 3A) for return to the device generating the active providers remote processing call 48 (shown in FIG. 3A).

It should be appreciated that the above described structure and processes for populating the provider control 36 is exemplary only. Those skilled in the art will also recognize that the list of providers could be obtained and stored within the mobile communication device 11. A list of providers stored within the mobile communication device 11 may then be used for populating both the provider control 36 and the active queue control 40. Upon a user selecting a provider from the list of active providers 78 rendered or shown within the provider control, the service client routine 38 requests a listing of active queues from the active queue routine or process 28 of the sequence component 22. The service client routine 38 populates the service control 40 with a listing of active queues associated with the selected provider.

More specifically, referring to FIG. 8C and FIG. 8D, the active queue routine or process 28 includes looking up (at step 126) in an active queues data store 208, a list of active queues associated with the selected provider. The active queues data store 208 may include a group of records 210, with each record associating a company ID 212 (identifying a provider) with identification of a group of active queues 214 associated with the company ID 212. The build active queues list (step 128) represents building an active queues message 54 (described above) for return to the device generating the active queue remote processing call 52 (described above).

Upon receipt of the active queues message 54, by service client routine 38, the service control 40 is populated by the list of active queues 80a as discussed with respect to FIG. 5B and FIG. 6.

It should be appreciated that the above described structure and processes for populating the service control 40 is exemplary only. Those skilled in the art will also recognize that lists of active queues for each provider could be obtained and stored within the mobile communication device 11 utilizing one or more remote processing calls prior to user selection. As such, list of providers and active queues stored within the mobile communication device 11 may then be used to populate both the provider control 36 and the active queue control 40. It is further envisioned that both the provider control 36 and the service control 40 may be combined within a single control listing combinations of a provider and a service.

More specifically, referring to FIG. 8E, the expected wait time routine or process 30 includes obtaining (at step 134) from the expected wait time component 18 associated with the selected queue of the selected provider, the expected wait time for the selected queue. Such step may include sending a remote processing call to the expected wait time component with data arguments (of the remote processing call) including identification of the selected queue. The return expected wait time to calling device (step 136) represents the expected wait time component 18 building an expected wait time message 58. The expected wait time message can then be sent to the device generating the expected wait time remote processing call 56.

Referring back to FIG. 5B, upon receipt of the expected wait time response message 58, the expected wait time value 148 identifying the expected wait time duration of time is rendered on the display screen as depicted by reference numeral 82. Following display of the identification of the duration of time, the confirmation control 44 may be activated for obtaining user input.

As discussed, the confirmation control may include a window 44a for confirming a telephone number of the mobile device (i.e., the telephone number utilized to establish an inbound telephone call to the mobile device 11), a confirmation control 44b and a cancel control 44c.

In an exemplary embodiment, the telephone number of the mobile device 11 may be pre-populated to the window object 44a with the window object being active to enable the user to modify the telephone number in the event he or she desires the call back to be at a different telephone station.

The cancel control 44c may be a selection button adapted to detect user selection. Upon detecting user selection, the cancel control object may be adapted to terminate operation of the session queuing component.

The accept control object 44b may be a selection button adapted to launch the confirmation client 46 upon user selection.

The confirmation client 46 (shown in FIG. 3A) may be adapted to send a confirmation remote processing call 60 to the sequence component 22 via the message structure described above. In this instance, the data arguments may include at least the identification of a telephone number or other telephone network address or the communication receiving device or mobile communication device 11 that the user desires for use in the connection to the service agent. Typically such identification will be a PSTN telephone number that the provider systems will use as a "call back number" to establish a telephone connection between the user and a service agent at the appropriate call back time.

Further, the arguments of the confirmation remote processing call may include identification of the selected provider and selected queue which the user desires to join. Alternatively, the arguments may include a session ID matched to previous remote processing calls such that the sequence component may determine the selected provider and selected queue which the user desires to join.

More specifically, referring to FIG. 8F, the confirmation routine or process 32 includes (at step 216) generating an add-to-queue instruction 217. The instruction may include for example, a queue ID of the selected queue and the call back number (e.g., the telephone network identifier of the mobile communication device 11) in a format compatible for transmission to the selected business communication center's systems. The step 218 of passing the add-to-queue instruction 217 to the queue component 20 of the selected provider is shown in FIG. 8F. This step includes packaging the SOAP formatted add-to-queue instruction with applicable transport layer and media layer for transmission as discussed above. Upon receipt, the queue component 20 of the selected provider may add the user to the selected queue.

The above described system represents an exemplary embodiment of a connection system for sequencing mobile device identifiers in a selected queue for connection to a service agent of a group of service agents at a business communication center. The present invention includes all such equivalents and modifications, and is limited only by the scope of the following claims.

The invention claimed is:

1. A mobile communication device for initiating a voice call-back sequence comprising:
   a display screen;
   a processor, located within the mobile communication device and configured to execute a device application, wherein the device application comprises:
      a first routine that sends a request to a communication system in a data format for a list of active providers;
      a second routine that receives from the communication system a list of active providers associated with a user of the mobile communication device;
      a third routine that sends a request to the communication system in a data format for an identification of active queues;
      a fourth routine that receives an identification of the active queues;
      a session queuing component that causes an indication of the active queues to be displayed on the display screen of the mobile communication device and obtains a user selection of a queue as a selected queue, wherein the session queuing component resides within the mobile communication device;
      a fifth routine that sends a request in a data format for an expected wait time to the communication system;
      a sixth routine that receives the expected wait time from the communication system; and
      a seventh routine that sends a confirmation in a data format for a voice call-back to the communication system.

2. The mobile communication device of claim 1, wherein the session queuing component is one or more of:
   a java script and ActiveX downloaded and executed by a browser; and
   a browser plug-in executing on the mobile communication device.

3. The mobile communication device of claim 1, wherein the device application comprises: a confirmation control that causes an indication of the expected wait time to be displayed and wherein a user selection of one of a confirmation command and a cancel command is obtained.

4. The mobile communication device of claim 1, wherein the device application further comprises: a provider control that causes an identification of at least two active providers to be displayed and obtains user selection of one of the active providers; and wherein the displayed indication of the queue is a queue associated with the selected active provider.

5. A mobile communication device for initiating a call-back sequence comprising:
   a display screen;
   a processor, located within the mobile communication device and configured to execute a device application, wherein the device application comprises:
      a provider client which generates a message to a communication system and receives a list of active providers;
      a provider control which displays on the display screen an identification of at least two active providers and obtains user selection of one of the active providers;
      a session queuing component, wherein the session queuing component using the display screen displays an indication of a queue and obtains a user selection of the queue as a selected queue, wherein the session queuing component resides within the mobile communication device, and wherein the displayed indication of a queue is a queue associated with the selected active provider;
      an expected wait time client that sends a request for an expected wait time via a message to a communication system and receives an indication of the expected wait time, and wherein the message includes identification of the selected queue;
      a confirmation control to display on the display screen the indication of the expected wait time and wherein a user selection of one of a confirmation command and a cancel command is obtained; and
      a confirmation wait time client that generates a confirmation message to the communication system in response to user selection of the confirmation command, the confirmation message includes at least a communication receiving device identifier and a request to add the device identifier to the selected queue.

6. The mobile communication device of claim 5, wherein the identifier is a telephone number.

7. The mobile communication device of claim 5, wherein the identifier is a network address.

8. A method for use with a mobile communication device for initiating a call-back sequence for selecting a voice call-back, the method comprising:
   sending a request in a data format to a communication system for a list of active providers;
   receiving a list of active providers associated with a user of the mobile communication device from the communication system;
   sending a request to the communication system in a data format for a list of active queues;
   receiving a message including the list of the active queues;
   displaying an indication of the list of active queues on a display screen of the mobile communication device using a session queuing component that resides within the mobile communication device;
   obtaining a user selection of a queue as a selected queue using the session queuing component;
   sending a request to the communication system in a data format for expected wait time;

receiving the expected wait time from the communication system; and sending a confirmation to the communication system in a data format for a call-back.

9. The method of claim 8, wherein the session queuing component is one or more of:
   a Java script and ActiveX downloaded and executed by a browser; and
   a browser plug-in executing on the mobile communication device.

10. The method of claim 8, further comprising: displaying an indication of the expected wait time and obtaining a user selection of one of a confirmation command and a cancel command.

11. The method of claim 9, further comprising:
   displaying an identification of at least two active providers and obtaining user selection of one of the active providers; and wherein the indication of the queue is a queue associated with the selected active provider.

12. A method for use with a mobile communication device having a display screen for initiating a call-back sequence for selecting a voice call-back, the method comprising:
   providing a provider client which generates a message to a communication system and receives a list of active providers;
   providing a provider control which displays an identification of at least two active providers on the display screen and obtains user selection of one of the active providers;
   providing a session queuing component for use on the mobile communication device, wherein the session queuing component displays an indication of a queue on the display screen and obtains a user selection of the queue as a selected queue, wherein the session queuing component resides within the mobile communication device, wherein the displayed indication of the queue is a queue associated with the selected active provider;
   providing an expected wait time client that sends a request for an expected wait time using a message to a communication system and receives an indication of the expected wait time, wherein the message includes identification of the selected queue;
   providing a routine to display the indication of the expected wait time on the display screen and wherein a user selection of one of a confirmation command and a cancel command is obtained; and
   providing a confirmation wait time client that generates a confirmation message to the communication system in response to user selection of the confirmation command, the confirmation message including at least a communication receiving device identifier and an instruction to add the device identifier to the selected queue.

13. The method of claim 12, wherein the identifier is a telephone number.

14. The method of claim 12, wherein the identifier is a network address.

15. A non-transitory computer readable medium for storing computer executable instructions for initiating a call-back sequence from a mobile communication device, the computer executable instructions comprising:
   sending to a communication system a request in a data format for a list of active providers;
   receiving a list of active providers associated with a user of the mobile communication device from the communication system;
   sending to the communication system a request in a data format for a list of active queues associated with an active provider;
   receiving a message including a list of the active queues;
   displaying an indication of the list of the active queues on a display screen of the mobile communication device using a session queuing component that resides within the mobile communication device;
   obtaining a user selection of a queue as a selected queue using the session queuing component;
   sending to the communication system a request in a data format for an expected wait time;
   receiving the expected wait time from the communication system; and
   sending to the communication system a confirmation for a call-back in a data format.

16. The non-transitory computer readable medium of claim 15, wherein the computer executable instructions are downloaded onto the computer readable medium.

17. The non-transitory computer readable medium of claim 15, wherein the session queuing component is one or more of:
   a java script and ActiveX downloaded and executed by a browser; and
   a browser plug-in executing on the mobile communication device.

18. The non-transitory computer readable medium of claim 15, wherein the computer executable instructions further include displaying a confirmation control on a display screen of a mobile communication device, wherein the confirmation control displays an indication of the expected wait time, and wherein a user selection of one of a confirmation command and a cancel command is obtained.

19. The non-transitory computer readable medium of claim 15, wherein the computer instructions further include displaying a provider control on a display screen of a mobile communication device, wherein the provider control displays the identification of at least two active providers on the display screen and obtains user selection of one of the active providers.

20. The non-transitory computer readable medium of claim 15, wherein the computer readable medium is connected to a mobile telephone device.

21. The mobile communication device of claim 1, wherein the processor causes the list of active providers and the active queues to be stored on the mobile communication device and to be displayed on the mobile communication device when the device is turned on.

* * * * *